(12) United States Patent
Smith (10) Patent No.: US 9,080,587 B1
(45) Date of Patent: Jul. 14, 2015

(54) SPIKE FOR SECURING A FLEXIBLE MEMBER TO EARTH STRATA

(71) Applicant: Michael C. Smith, Fairview, TN (US)

(72) Inventor: Michael C. Smith, Fairview, TN (US)

( * ) Notice: Subject to any disclaimer, the term of this patent is extended or adjusted under 35 U.S.C. 154(b) by 136 days.

(21) Appl. No.: 13/645,886

(22) Filed: Oct. 5, 2012

(51) Int. Cl.
*E02D 5/80* (2006.01)
*F16B 15/02* (2006.01)
*F16B 15/06* (2006.01)
*A63C 19/00* (2006.01)

(52) U.S. Cl.
CPC ............. *F16B 15/02* (2013.01); *A63C 19/00* (2013.01); *F16B 15/06* (2013.01)

(58) Field of Classification Search
CPC ................................. F16B 15/02; F16B 15/06
USPC ............ 405/259.1, 302.7; 135/118; 411/452, 411/487, 456, 457, 471
See application file for complete search history.

(56) References Cited

U.S. PATENT DOCUMENTS

| | | | | |
|---|---|---|---|---|
| 2,334,406 | A * | 11/1943 | Gray | 411/484 |
| 2,533,062 | A * | 12/1950 | Spink | 411/470 |
| 3,860,213 | A * | 1/1975 | Heenan | 248/466 |
| 4,027,410 | A | 6/1977 | Wheeler | |
| 4,056,936 | A * | 11/1977 | Mayer | 405/302.7 |
| 4,768,900 | A * | 9/1988 | Burland | 405/259.1 |
| 4,781,508 | A * | 11/1988 | Schroeder et al. | 411/452 |
| 4,905,718 | A | 3/1990 | Vandiver | |
| 5,069,589 | A * | 12/1991 | Lemke | 411/533 |
| 5,141,200 | A * | 8/1992 | Sherman et al. | 248/500 |
| 5,389,057 | A * | 2/1995 | Zagata, Jr. | 482/83 |
| 5,720,579 | A | 2/1998 | Trangsrud | |
| 5,749,180 | A | 5/1998 | Jewett et al. | |
| 5,930,947 | A | 8/1999 | Eckhoff | |
| 5,987,834 | A * | 11/1999 | Keith et al. | 52/410 |
| 7,670,093 | B2 * | 3/2010 | Reynolds | 411/452 |
| 7,972,079 | B2 | 7/2011 | Carlson et al. | |
| 2004/0124331 | A1 | 7/2004 | Kornacki | |
| 2006/0120821 | A1 * | 6/2006 | Kaye et al. | 411/29 |
| 2007/0001089 | A1 * | 1/2007 | Moblo | 249/3 |
| 2008/0184538 | A1 * | 8/2008 | Shellnutt | 24/326 |
| 2009/0038214 | A1 | 2/2009 | Rozen | |

FOREIGN PATENT DOCUMENTS

| | | | | |
|---|---|---|---|---|
| EP | 1972720 | A1 * | 9/2008 | E01C 9/08 |
| EP | 2042659 | A1 | 4/2009 | |

OTHER PUBLICATIONS

Sandmat 350 Bunker Liner Brochure (1 page).
Sandmat 400 Bunker Liner Brochure (1 page).
POLY-SPIKE Brochure (2 pages).

* cited by examiner

*Primary Examiner* — Frederick L Lagman
(74) *Attorney, Agent, or Firm* — Stephen T. Belsheim (57) ABSTRACT

An elongate bunker spike that secures a flexible golf bunker liner to the earth strata when the bunker spike is driven through the bunker liner into the earth strata. The bunker spike has a point member adjacent to the axial forward spike end, a ribbed member adjacent to the axial rearward spike end and wherein the ribbed member is contiguous with the point member. A head is at the axial rearward spike end wherein the ribbed member joins the head at the underneath surface. A barb extends from the underneath surface of the head whereby the barb engages the flexible golf bunker liner when the elongate bunker spike is embedded in the earth strata.

18 Claims, 5 Drawing Sheets

SPIKE FOR SECURING A FLEXIBLE MEMBER TO EARTH STRATA

BACKGROUND

The invention pertains to a spike for securing a flexible member to the earth strata. More specifically, the invention pertains to an elongate bunker spike for securing a flexible golf sand bunker liner to the earth strata.

Most golf courses employ sand bunkers as hazards to increase the difficulty of the golf hole. While a sand bunker may be located in a variety of locations on a golf course, the typical locations are either near the green, i.e., greenside bunker, or near or in the fairway, i.e., fairway bunker. A golf bunker typically comprises an excavation in the ground (i.e., earth strata) that contains sand. It is important for the sand to maintain its integrity in the golf bunker. This can be a challenge for a number of reasons. Heavy rains can tend to erode and move the sand out of the bunker. Thus, it is important for the bunker to exhibit a capability to retain sand in the bunker. Dirt from the floor of the excavation can migrate into the sand thereby diminishing the consistency and integrity of the sand. It is therefore important to prevent or at least minimize the migration of dirt into the sand in the bunker.

One way to help maintain the sand in the bunker and minimize the migration of dirt and other foreign objects into the sand is to position a bunker liner on the floor of the bunker excavation. The bunker liner is a flexible member that is secured to the earth strata so it does no move or shift. Bunker liners include the SANDMAT® Model SM350 and SM400 distributed by Milliken Design, Inc. of Spartanburg, S.C. According to the records of the United States Patent and Trademark Office, SANDMAT® is a registered trademark (Supplemental Registration No. 2,990,746) owned by Milliken Design, Inc.

There are a number of fasteners used to fasten or secure the bunker liner to the ground, i.e., earth strata. One such fastener is a six-inch, U-shaped, 11 gauge, wire staple. Using these wire staples is an inexpensive way to secure the bunker liner to the earth strata; however, they possess the least amount of holding power. This means that over time, a bunker liner secured with the wire staples will become loose, and eventually move or shift position. It is undesirable for the bunker liner to move or shift after being secured to the earth strata. Another fastener useful to secure the bunker liner to the earth strata is six inch spike sold under the designation Poly-Spike by EMMA Sales, LLC of Fairview, Tenn. The six-inch Poly-Spike exhibits significant holding power so that the bunker liner is secured for a long time. However, the six-inch Poly-Spike is more expensive to use than the wire staple. Whether one uses the wire staples or the six-inch Poly-Spikes, the fasteners are located about every six inches within the bunker and driven into the ground or earth strata. The heads of the spikes, i.e., the wire staples or the six-inch Poly-Spikes, are then applied with glue to fasten the head of the spike to the bunker liner material.

The six-inch Poly-Spike has two legs that extend to penetrate the bunker liner. While the use of two legs results in a significant holding power, the use of two legs increases the cost of the spike. It would be highly desirable to provide a bunker spike that exhibits significant holding power and yet uses only one leg thereby decreasing the cost of the spike.

Earlier spikes used to secure bunker liner have use a plus sign shaped point. These plus-sign shaped point spikes have experienced a more difficult time penetrating the fabric. It would thus be highly desirable to provide a bunker spike that more easily penetrates the bunker liner material during installation of the bunker liner, and more specifically, during the step of securing the bunker liner to the earth strata using the bunker spike.

Earlier spikes, e.g., the wire staples or the six-inch Poly-Spikes, used to secure the bunker liner to the earth strata have used a separate step of applying glue to the spike to hold it to the bunker liner material. The requirement of gluing the spike to the bunker liner material adds additional expense to the installation process. It would be highly desirable to provide a spike that holds the bunker liner material by itself without the need for glue. This would result in significant cost savings in material and labor connected with the installation of the liner.

SUMMARY

In one form, the invention is an elongate bunker spike for penetration of and engagement with a flexible golf bunker liner wherein the elongate bunker spike is embedded in the earth strata. The bunker spike comprises an axial forward spike end and an axial rearward spike end. The elongate bunker spike has a central longitudinal axis. The spike has a point member adjacent to the axial forward spike end wherein the point member has an axial forward point end at which there is a point and an axial rearward point end at which there is an axial rearward termination. The spike further has a ribbed member adjacent to the axial rearward spike end wherein the ribbed member has an axial forward ribbed end and an axial rearward ribbed end. The point member is contiguous with the ribbed member. The spike also has a head at the axial rearward spike end wherein the head has a top surface and an underneath surface wherein the ribbed member joins the head at the underneath surface. A barb extends from the underneath surface of the head whereby the barb engages the flexible golf bunker liner when the elongate bunker spike is embedded in the earth strata.

In another form, the invention is an assembly of a flexible golf bunker liner and an elongate bunker spike. The assembly includes a flexible golf bunker liner having an earth strata side, a sand side, and a compressed thickness. The assembly further includes a bunker spike that comprises an axial forward spike end and an axial rearward spike end. The elongate bunker spike has a central longitudinal axis. The spike has a point member adjacent to the axial forward spike end wherein the point member has an axial forward point end at which there is a point and an axial rearward point end at which there is an axial rearward termination. The spike further has a ribbed member adjacent to the axial rearward spike end wherein the ribbed member has an axial forward ribbed end and an axial rearward ribbed end. The point member is contiguous with the ribbed member. The spike also has a head at the axial rearward spike end wherein the head has a top surface and an underneath surface wherein the ribbed member joins the head at the underneath surface. A barb extends from the underneath surface of the head whereby the barb engages the flexible golf bunker liner when the elongate bunker spike is embedded in the earth strata. The barb has an axial barb length greater than the compressed thickness of the bunker liner.

BRIEF DESCRIPTION OF THE DRAWINGS

Set forth below is a brief description of the drawings that form a part of this patent application.

DETAILED DESCRIPTION

Figure 1:
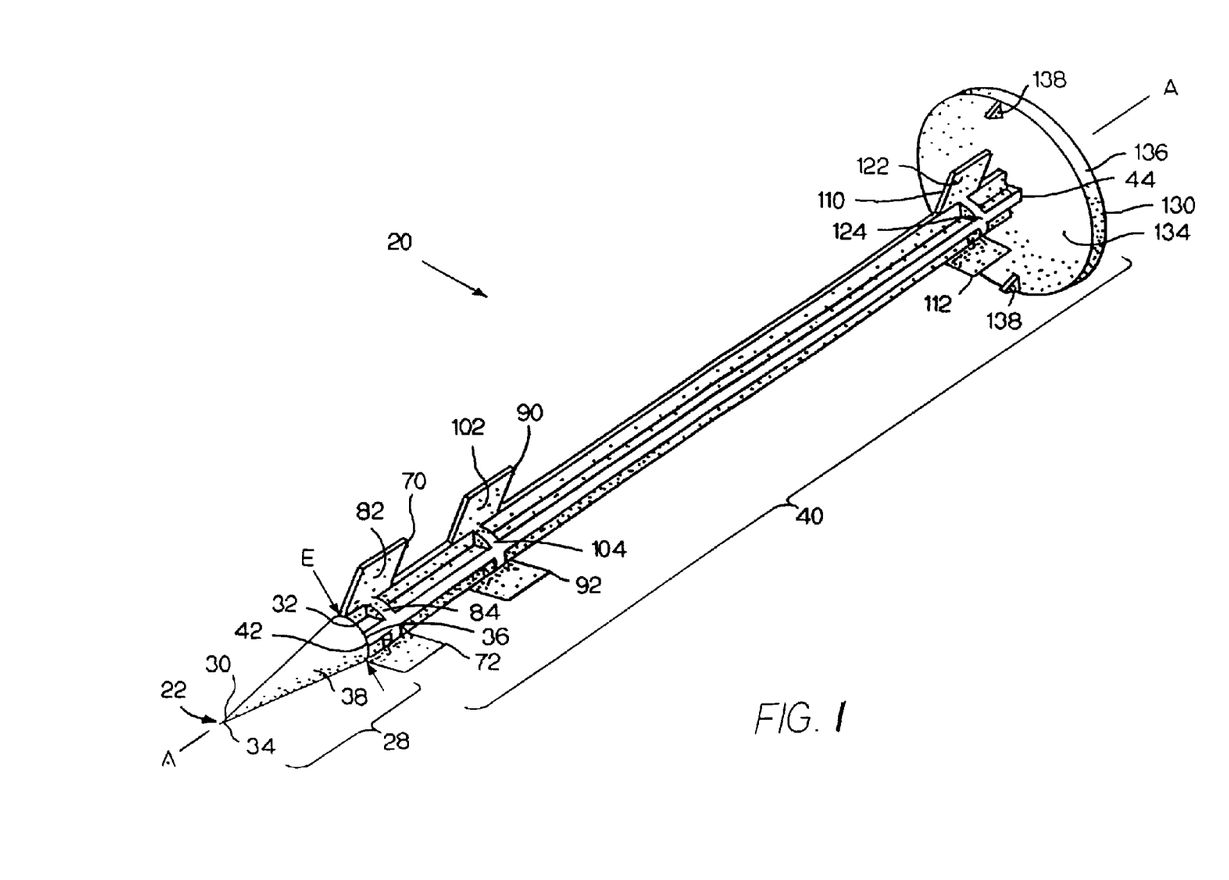
FIG. 1 is an isometric view of a specific embodiment of the bunker spike.

Referring to the drawings, FIG. 1 is an isometric view of the elongate bunker spike generally designated as 20. There should be an appreciation that the bunker spike 20 use only one leg in contrast to two legs such as used by the spike sold under the designation Poly-Spike by EMMA Sales, LLC of Fairview, Tenn. By eliminating the second leg, the cost of the bunker spike 20 is decreased significantly as compared to the cost of a spike that uses two legs. Such a decrease in cost is a advantage of the present bunker spike 20 as compared to earlier two-legged spikes.

Figures 2, 2A:
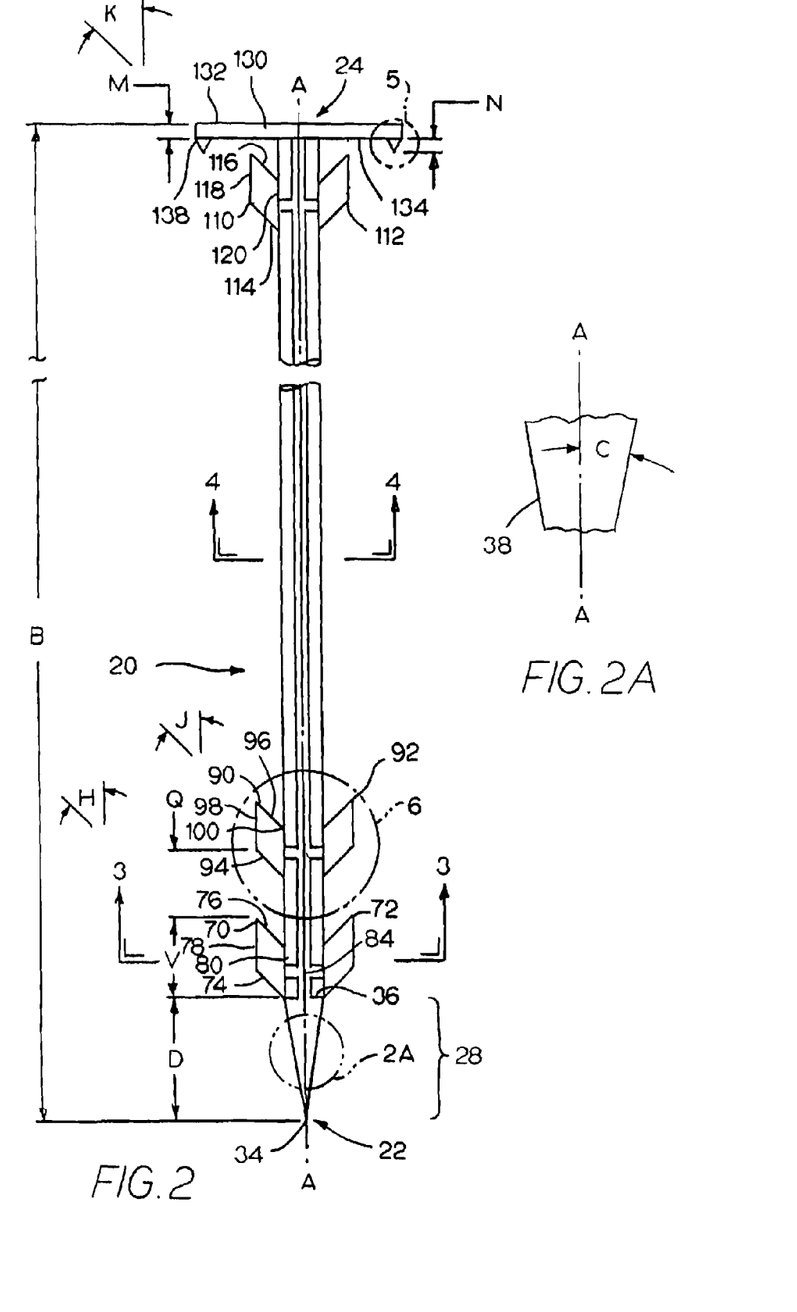
FIG. 2 is a side view of the specific embodiment of the bunker spike of FIG. 1.
FIG. 2A is an enlarged view of a part of the point member of the specific embodiment of FIG. 2 shown in circle 2A in FIG. 2.

Bunker spike 20 has an axial forward spike end generally designated as 22 and an axial rearward spike end generally designated as 24 (see FIG. 2). The elongate bunker spike 20 has a central longitudinal axis A-A. The elongate bunker spike 20 further has an axial spike length B (see FIG. 2) extending from the axial forward spike end 22 and the axial rearward spike end 24.

The elongate bunker spike 20 further has a generally conical point member 28 (bracket in FIG. 1) adjacent to the axial forward spike end 22. The point member 28 has an axial forward point end 30 and an axial rearward point end 32. The point member 28 has a point 34 at the axial forward point end 30, and an axial rearward termination 36 at the axial rearward point end 32. A generally conical side surface 38 extends between the axial forward point end 30 and the axial rearward point end 32. The conical point member 28 is solid and extends to the elongate ribbed member 40 as will become apparent. By using a solid conical point member 28, the elongate bunker spike 20 is able to penetrate the bunker liner fabric without difficulty. This is in contrast to a spike exhibiting a plus sign-shaped point that experiences a more difficult time penetrating the bunker liner fabric. Of course, it is an advantage for the bunker spike to be able to more easily penetrate the bunker liner fabric.

In the specific embodiment of FIG. 1, the conical side surface 38 has a conical angle of taper C (see FIG. 2A) equal to about 20 degrees. There is the contemplation that the conical angle of taper C can range between about 15 degrees and 25 degrees relative to the central longitudinal axis A-A of the elongate bunker spike 20. In the specific embodiment, the point member 28 has an axial point member length D equal to about 12.5 percent of the axial spike length B. There is the contemplation that the axial point member length D can range between about 10 percent and about 20 percent of the axial spike length B. Further, the point member 28 has a maximum transverse dimension E equal to about 4 percent of the axial spike length B. There is the contemplation that the point member 28 has a maximum transverse dimension E equal to between about 4 percent and about 6 percent of the axial spike length B.

The elongate bunker spike 20 further includes an elongate ribbed member generally designated by bracket 40. The elongate ribbed member 40 is adjacent to the axial rearward spike end 24. The elongate ribbed member 40 has an axial forward ribbed end 42 and an axial rearward ribbed end 44. The elongate ribbed member 40 has a transverse rib dimension F equal to about 4 percent of the axial spike length B. There is the contemplation that the transverse rib dimension F can equal to between about 4 percent and about 6 percent of the axial spike length B.

The point member 28 is contiguous with the elongate ribbed member 40.

The elongate ribbed member 40 comprises four generally radial rib sections (48, 50, 52, 54) each of which extends radially from a common central portion 56. In the specific embodiment of FIG. 1, the rib sections are (48, 50, 52, 54) disposed about 90 degrees apart. The rib sections (48, 50, 52, 54) each have a thickness of dimension "P". The ribbed geometry of the elongate ribbed member 40 reduces the overall weight of bunker spike 20 in comparison to a solid section without sacrificing the strength of the bunker spike. It is an advantage to reduce the weight of the bunker spike 20 without reducing the strength of the bunker spike 20.

Figure 4:
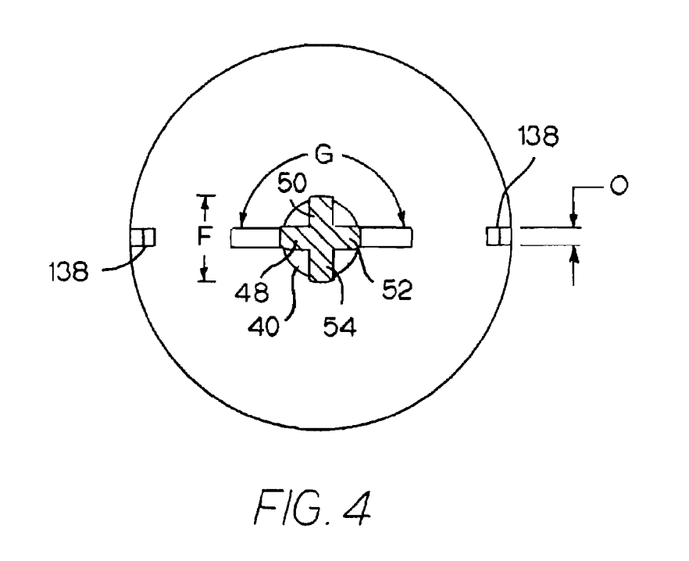
FIG. 4 is a cross-sectional view of the specific embodiment of the spike of FIG. 1 taken along section line 4-4 of FIG. 2.

The elongate bunker spike 20 further includes a pair of axial forward fins (70, 72) that are adjacent the axial forward ribbed end 42 and each axial forward fin (70, 72) extends radially outwardly from the ribbed member 40. In the specific embodiment of FIG. 1, the axial forward fins (70, 72) are disposed about 180 degrees apart as shown by angle G in FIG. 4. The axial forward fins (70, 72) are essentially the same so that a description of axial forward fin 70 will suffice for the description of the other axial forward fin 72. Axial forward fin 70 has a leading edge 74, a trailing edge 76, a distal edge 78 and a proximate edge 80. The axial forward fin 70 further has opposite planar surface 82. The axial distance from the beginning of the leading edge 74 to the termination of the distal edge 78 is distance "V". The leading edge 74 is disposed at a fin angle of disposition H (see FIG. 2) relative to the central longitudinal axis A-A equal to about 45 degrees. There is the contemplation that the fin angle of disposition H relative to the central longitudinal axis A-A can range between about 40 degrees and about 50 degrees. The axial forward fin 70 attaches at the proximate edge 80 to the ribbed member 40.

The ribbed member 40 has an axial forward transverse support rib 84 adjacent the location of the axial forward fins (70, 72). The axial forward transverse support rib 84 provides additional structural support for the ribbed member 40 at the location of the axial forward fins (70, 72).

Figure 6:
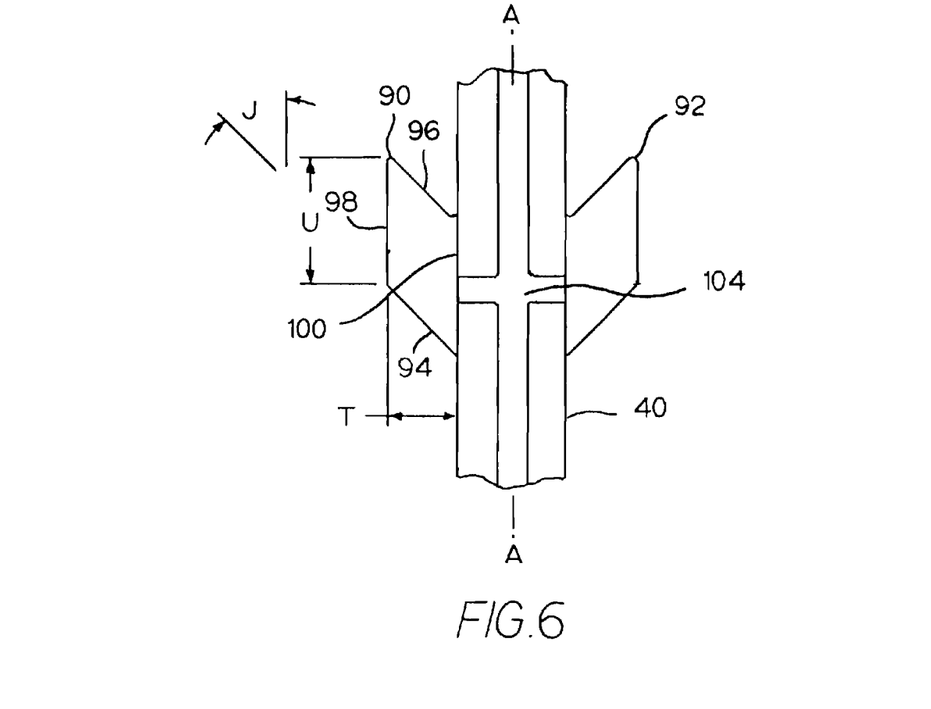
FIG. 6 is an enlarged view of the member of the specific embodiment of the spike of FIG. 1 shown in circle 6 of FIG. 2.

The elongate bunker spike 20 further includes a pair of mediate fins (90, 92) that are located at a position axial rearward of the axial forward fins (70, 72). Each axial mediate fin (90, 92) extends radially outwardly from the ribbed member 40. As shown in FIG. 6, the mediate fin 90 extends radially from the ribbed member 40 a distance "T". In the specific embodiment of FIG. 1, the mediate fins (90, 92) are disposed about 180 degrees apart. The mediate fins (90, 92) are essentially the same so that a description of axial forward fin 90 will suffice for the description of the other axial forward fin 92. Mediate fin 90 has a leading edge 94, a trailing edge 96, a distal edge 98 (which has an axial length "U") and a proximate edge 100. The mediate fin 90 further has opposite planar surface 102. The leading edge 94 is disposed at a fin angle of disposition J relative to the central longitudinal axis A-A equal to about 45 degrees. There is the contemplation that the fin angle of disposition J relative to the central longitudinal axis A-A can range between about 40 degrees and about 50 degrees. The axial mediate fin 90 attaches at the proximate edge 100 to the ribbed member 40. The axial rearward end of the distal edge 78 of the axial forward fin 70 is spaced apart from the beginning of the distal edge 98 of the mediate fin 90 a distance "Q".

The ribbed member 40 has an axial mediate support rib 104 adjacent the location of the mediate fins (90, 92). The axial mediate support rib 104 provides additional structural support for the ribbed member 40 at the location of the axial forward fins (90, 92).

One should understand that the use of the axial forward fins (70, 72) in conjunction with the mediate fins (90, 92) provide for an increase in the holding power of the bunker spike 20. An increase in the holding power of the bunker spike 20 provides an advantage by better maintaining the bunker liner in position even during adverse weather conditions (e.g., heavy rains) to resist damage to the sand bunker (e.g., bunker wash-out).

The elongate bunker spike 20 further includes a pair of axial rearward fins (110, 112) that are adjacent the axial rearward ribbed end 44 and each axial rearward fin (110, 112) extends radially outwardly from the ribbed member 40. In the specific embodiment of FIG. 1, the axial rearward fins (110, 112) are disposed about 180 degrees apart. The axial rearward fins (110, 112) are essentially the same so that a description of axial rearward fin 110 will suffice for the description of the other axial rearward fin 112. Axial rearward fin 110 has a leading edge 114, a trailing edge 116, a distal edge 118 and a proximate edge 120. The axial rearward fin 110 further has opposite planar surface 122. The leading edge 114 is disposed at a fin angle of disposition K relative to the central longitudinal axis A-A equal to about 45 degrees. There is the contemplation that the fin angle of disposition K relative to the central longitudinal axis A-A can range between about 40 degrees and about 50 degrees. The axial rearward fin 110 attaches at the proximate edge 120 to the ribbed member 40. The axial rearward fins (110, 112) are located under the head 130 of the bunker spike 20 and function as an undercut after the bunker spike 20 is installed through the bunker liner material.

The ribbed member 40 has an axial rearward transverse support rib 124 adjacent the location of the axial rearward fins (110, 112). The axial rearward transverse support rib 124 provides additional structural support for the ribbed member 40 at the location of the axial rearward fins (110, 112).

The axial forward transverse support rib 84, an axial mediate support rib 104, and axial rearward transverse support rib 124 provide additional support to the connection between their corresponding fins and the elongate ribbed member 40. The axial forward transverse support rib 84, an axial mediate support rib 104, and axial rearward transverse support rib 124 further provide support for the ribs (48, 50, 52, 54) so the ribs do not break off during installation and/or use.

Figure 5:
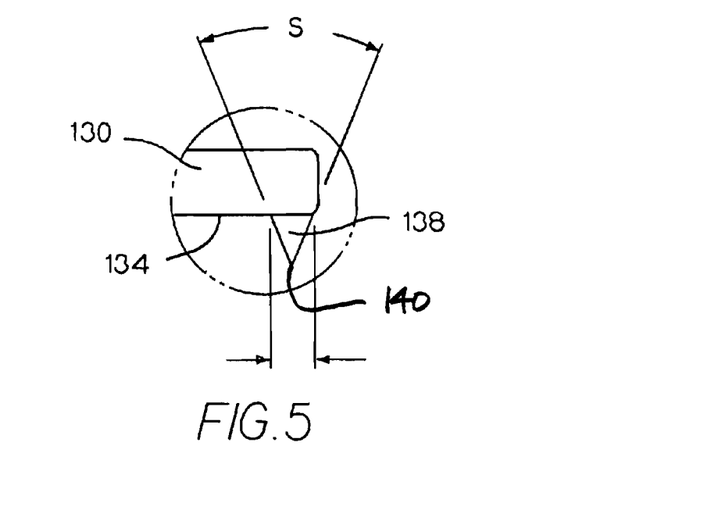
FIG. 5 is an enlarged view of the member of the specific embodiment of the spike of FIG. 1 shown in circle 5 of FIG. 2.

The elongate bunker spike 20 further includes a head 130 adjacent the axial rearward spike end 24. The head 130 has a top surface 132 and an underneath surface 134 wherein the elongate ribbed member 40 joins the head 130 at the underneath surface 134 thereof. The head 130 further has a circumferential edge 136. The head 130 is of a circular shape so as to have a diameter (i.e., a transverse dimension) "L". The diameter of the head of the bunker spike 20 is sufficiently large to provide a larger area to better hold down the bunker liner. The head 130 has a thickness "M". A pair of integral barbs 138, each of which has converging surfaces 142 that converge at a point 140, project in an axial rearward direction away from the underneath surface 134. The barbs 138 project a distance "N" from the underneath surface 134. The barbs 138 are of a width "O". The angle of disposition of the opposite surfaces of the barb 138 is "S" (see FIG. 5). The barbs 138 and head 130 are contiguous.

Figure 7:
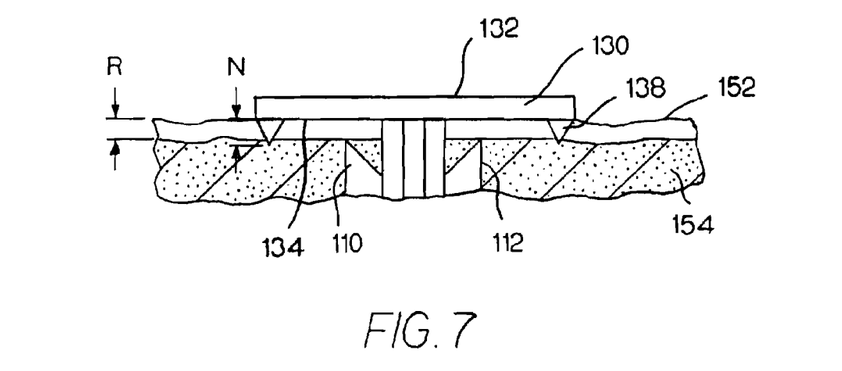
FIG. 7 is a side view showing the bunker spike engaging the bunker liner wherein the barbs engage the bunker liner and penetrate the earth strata.

FIG. 7 is a side view that shows the engagement of the barbs 138 of the head 130 with the bunker liner 152. The barbs 138 penetrate or snag the bunker liner 152 in such a fashion as to securely hold the bunked liner 152, and except for the driving of the bunker spike 20 into the earth strata 154, prevent the bunker spike 20 from moving relative to the bunker liner material. The axial length N of the barb 138 is slightly greater than the compressed thickness of the bunker liner material (see dimension "R") so that when the bunker spike 20 is fully embedded into the earth strata, even the barbs 138 penetrate into the earth strata. FIG. 7 shows that upon installation, the bunker spikes penetrate into the earth strata so as to be embedded in the earth strata. Further, FIG. 7 shows that the axial rearward fins (110, 112) contact or engage the bunker liner material. Such contact or engagement enhances the holding power of the elongate bunker spike 20 to maintain the flexible bunker liner in position.

Figure 8:
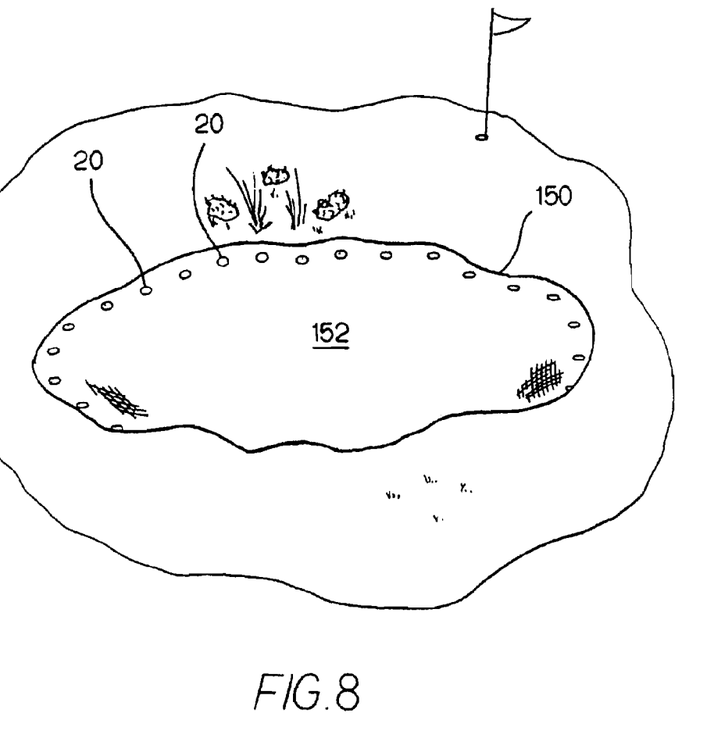
FIG. 8 is an isometric view showing the golf bunker excavation with the bunker line secured to the earth strata.

FIG. 8 illustrates a golf bunker excavation 150 with the flexible bunker liner 152 secured to the earth strata via a plurality of the elongate bunker spikes 20. The elongate bunker spikes 20 are spaced apart at the periphery of the flexible bunker liner 152. The elongate bunker spikes 20 are driven through the flexible bunker liner 152 and into the earth strata thereby securing the bunker liner 152 to the earth strata. The barbs 138 actually engage the flexible bunker liner 152 to secure it to the earth strata with great holding force thereby eliminating the need to glue the bunker liner to the spike as was the case for earlier bunker spikes. The elimination of the gluing step reduces the expenses connected with the installation of the golf bunker liner. Once secured to the earth strata, the bunker liner 152 is resistant to movement so that the integrity of the sand bunker is maintained through heavy rains or other environmental occurrences.

Table I below sets forth exemplary dimensions for the specific embodiment of the bunker spike 20 of FIG. 1. There is no intention to be limited by these specific dimensions because they are exemplary of a specific embodiment. Even so, these specific dimensions and the various dimensional relationships between different features of the specific embodiment of the bunker spike 20 of FIG. 1 are contemplated to be within the concept of the invention.

TABLE I

Exemplary Dimensions of the Specific Embodiment of FIG. 1

| Dimension Reference | Description of Dimension | Value of Dimension (inches) |
|---|---|---|
| B (FIG. 2) | axial spike length | 6.000 inches |
| C (FIG. 2A) | conical angle of taper | 10 degrees |
| D (FIG. 2) | axial point member length | 0.750 inches |
| E (FIG. 1) | maximum transverse dimension of point member | 0.250 inches |
| F (FIG. 4) | transverse rib dimension | 0.250 inches |
| G (FIG. 4) | disposition angle of axial forward fins | 180 degrees |
| H (FIG. 2) | disposition angle of leading edge of axial forward fins | 45 degrees |
| I | — | — |
| J (FIG. 2) | disposition angle of leading edge of mediate fins | 45 degrees |
| K (FIG. 2) | disposition angle of leading edge of axial rearward fins | 45 degrees |

TABLE I-continued

Exemplary Dimensions of the Specific Embodiment of FIG. 1

Figure 3:
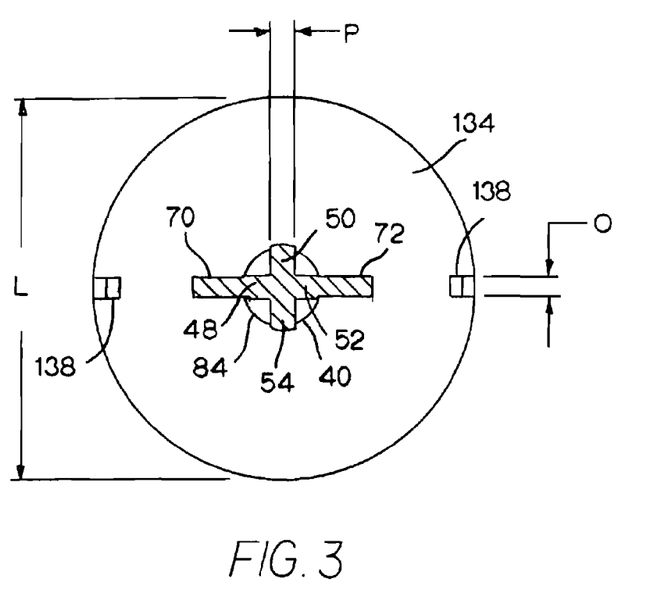
FIG. 3 is a cross-sectional view of the specific embodiment of the spike of FIG. 1 taken along section line 3-3 of FIG. 2.

| Dimension Reference | Description of Dimension | Value of Dimension (inches) |
|---|---|---|
| L (FIG. 3) | diameter of the head | 1.250 inches |
| M (FIG. 2) | thickness of the head | 0.100 inches |
| N (FIG. 2) | distance barbs project in axial rearward direction | 0.080 inches |
| O (FIG. 3) | width of the barbs | 0.060 inches |
| P (FIG. 3) | thickness of the rib sections | 0.075 inches |
| Q (FIG. 2) | axial rearward end of the distal edge 76 of the axial forward fin 70 is spaced apart from the beginning of the distal edge 98 of the mediate fin 90 | 0.40 inches |
| R (FIG. 7) | compressed bunker liner thickness | 0.080 inches |
| S (FIG. 5) | angle of disposition of the barb | 45 degrees |
| T (FIG. 6) | distance of the radial extension of mediate fin 90 | 0.165 inches |
| U (FIG. 6) | axial length of distal edge 98 | 0.300 inches |
| V (FIG. 2) | axial distance from the beginning of the leading edge 74 to the termination of the distal edge 78 | 0.390 inches |

It is apparent that the bunker spike of the invention provides a bunker spike that exhibits significant holding power, and yet, uses only one leg thereby decreasing the cost of the spike. There is a meaningful advantage inherent in the decrease in the cost of the spike.

It is apparent that the bunker spike of the invention provides a bunker spike that more easily penetrates the bunker liner material during installation of the bunker liner. More specifically, the bunker spike of the invention provides a bunker spike that more easily penetrates the bunker liner material during the step of securing the bunker liner to the earth strata using the bunker spike.

It is apparent that the bunker spike of the invention provides a bunker spike that holds the bunker liner material by itself without the need for glue. By eliminating the gluing step, the use of the inventive bunker liner leads to significant cost savings in material and labor connected with the installation of the liner.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. An elongate bunker spike for penetration of and engagement with a flexible golf bunker liner wherein the elongate bunker spike being embedded in the earth strata so as to secure the flexible golf bunker liner to the earth strata, the bunker spike comprising:

an axial forward spike end and an axial rearward spike end;
the elongate bunker spike having a central longitudinal axis;
a point member adjacent to the axial forward spike end, and the point member having an axial forward point end at which there is a point and an axial rearward point end at which there is an axial rearward termination;
a ribbed member adjacent to the axial rearward spike end, the ribbed member having an axial forward ribbed end and an axial rearward ribbed end, and the point member being contiguous with the ribbed member, and the point member comprising a generally conical side surface extending from the axial forward point end toward the ribbed member; and
a head at the axial rearward spike end, the head having a top surface and an underneath surface wherein the ribbed member joins the head at the underneath surface, and a barb extending from the underneath surface of the head whereby the barb engages the flexible golf bunker liner when the elongate bunker spike being embedded in the earth strata whereby the elongate bunker spike secures the flexible golf bunker liner to the earth strata.

2. The elongate bunker spike according to claim 1 wherein the elongate spike having an axial spike length extending from the axial forward spike end to the axial rearward spike end.

3. The elongate bunker spike according to claim 2 wherein the generally conical side surface of the point member extending between the axial forward point end and the axial rearward point end, the conical surface having a conical angle of taper equal to between about 15 degrees and 25 degrees relative to the central longitudinal axis of the spike body; the point member having an axial point member length equal to between about 10 percent and about 20 percent of the axial spike length; and the point member having a maximum transverse dimension equal to between about 4 percent and about 6 percent of the axial spike length.

4. The elongate bunker spike according to claim 2 wherein the ribbed member having a generally transverse rib dimension being between about 4 percent and about 6 percent of the axial spike length.

5. The elongate bunker spike according to claim 2 wherein the head being generally circular and having a head diameter wherein the head diameter ranges between about 15 percent and about 25 percent of the axial spike length.

6. The elongate bunker spike according to claim 5 wherein the head being generally circular and having a head diameter wherein the head diameter is about 20.8 percent of the axial spike length.

7. The elongate bunker spike according to claim 2 wherein the barb has a barb axial length, and the barb axial length ranges between about 2 percent and about 7 percent of the axial spike length.

8. The elongate bunker spike according to claim 7 wherein the barb has a barb axial length, and the barb axial length is about 5 percent of the axial spike length.

9. An elongate bunker spike for penetration of and engagement with a flexible golf bunker liner wherein the elongate bunker spike being embedded in the earth strata, the bunker spike comprising:

an axial forward spike end and an axial rearward spike end;
the elongate bunker spike having a central longitudinal axis;
a point member adjacent to the axial forward spike end, and the point member having an axial forward point end at which there is a point and an axial rearward point end at which there is an axial rearward termination;
a ribbed member adjacent to the axial rearward spike end, the ribbed member having an axial forward ribbed end and an axial rearward ribbed end, and the point member being contiguous with the ribbed member;
a head at the axial rearward spike end, the head having a top surface and an underneath surface wherein the ribbed member joins the head at the underneath surface, and a barb extending from the underneath surface of the head whereby the barb engages the flexible golf bunker liner when the elongate bunker spike being embedded in the earth strata; and further including an axial forward fin being adjacent the axial forward ribbed end and extending radially outwardly from the ribbed member; the axial forward fin having a leading edge, a trailing edge, a distal edge and a proximate edge; and the leading edge being disposed at an angle between about 40 degrees and about 50 degrees relative to the central longitudinal axis of the spike body, and the ribbed member having an axial forward transverse support rib adjacent the location of the axial forward fin.

10. The elongate bunker spike according to claim 9 further including a mediate fin being axial rearward of the axial forward fin and extending radially outwardly from the ribbed member; the mediate fin having a leading edge, a trailing edge, a distal edge and a proximate edge; and the leading edge of the mediate fin being disposed at an angle between about 40 degrees and about 50 degrees relative to the central longitudinal axis of the spike body, and the ribbed member having a mediate transverse support rib adjacent the location of the mediate fin.

11. The elongate bunker spike according to claim 10 further including an axial rearward fin being adjacent the axial rearward ribbed end and extending radially outwardly from the ribbed member; the axial rearward fin having a leading edge, a trailing edge, a distal edge and a proximate edge; and the leading edge of the axial rearward fin being disposed at an angle between about 40 degrees and about 50 degrees relative to the central longitudinal axis of the spike body, and the ribbed member having an axial rearward transverse support rib adjacent the location of the axial rearward fin.

12. The elongate bunker spike according to claim 11 wherein the leading edge of the axial forward fin being disposed at an angle equal to about 45 degrees relative to the central longitudinal axis of the spike body, the leading edge of the mediate fin being disposed at an angle equal to about 45 degrees relative to the central longitudinal axis of the spike body, and the leading edge of the axial rearward fin being disposed at an angle equal to about 45 degrees relative to the central longitudinal axis of the spike body.

13. The elongate bunker spike according to claim 11 wherein when the elongate bunker spike is embedded in the ground, the axial rearward fin engages the flexible bunker liner.

14. An assembly of a flexible golf bunker liner and an elongate bunker spike comprising:
a flexible golf bunker liner having an earth strata side, a sand side, and a compressed thickness;
the elongate spike comprising an axial forward spike end and an axial rearward spike end;
the elongate bunker spike having a central longitudinal axis;
a point member adjacent to the axial forward spike end, and the point member having an axial forward point end at which there is a point and an axial rearward point end at which there is an axial rearward termination;
a ribbed member adjacent to the axial rearward spike end, the ribbed member having an axial forward ribbed end and an axial rearward ribbed end, and the point member being contiguous with the ribbed member; and
a head at the axial rearward spike end, the head having a top surface and an underneath surface wherein the ribbed member joins the head at the underneath surface, and a barb extending from the underneath surface of the head whereby the barb engages the flexible golf bunker liner when the elongate bunker spike being embedded in the earth strata, and the barb having an axial barb length greater than the compressed thickness of the bunker liner.

15. The assembly of a flexible golf bunker liner and an elongate bunker spike according to claim 14 wherein the elongate spike further including an axial rearward fin being adjacent the axial rearward ribbed end and extending radially outwardly from the ribbed member; and axial rearward fin engages the flexible bunker liner when the elongate bunker spike being embedded in the earth strata.

16. An assembly of a flexible golf bunker liner and an elongate bunker spike comprising:
a flexible golf bunker liner having an earth strata side, a sand side, and a compressed thickness;
the elongate spike comprising an axial forward spike end and an axial rearward spike end, and the elongate spike having an axial spike length;
the elongate bunker spike having a central longitudinal axis;
a point member adjacent to the axial forward spike end;
a ribbed member adjacent to the axial rearward spike end, the ribbed member having an axial forward ribbed end and an axial rearward ribbed end, and the point member being contiguous with the ribbed member;
a head at the axial rearward spike end, the head having a top surface and an underneath surface wherein the ribbed member joins the head at the underneath surface, and a barb extending from the underneath surface of the head whereby the barb engages the flexible golf bunker liner when the elongate bunker spike is embedded in the earth strata, and the barb having an axial barb length greater than the compressed thickness of the bunker liner; and
the elongate spike further including an axial rearward fin being adjacent the axial rearward ribbed end and extending radially outwardly from the ribbed member; and axial rearward fin engages the flexible bunker liner when the elongate bunker spike is embedded in the earth strata.

17. The assembly of a flexible golf bunker liner and an elongate bunker spike according to claim 16 wherein the barb has a barb axial length, and the barb axial length ranges between about 2 percent and about 7 percent of the axial spike length.

18. The assembly of a flexible golf bunker liner and an elongate bunker spike according to claim 16 wherein the barb has a barb axial length, and the barb axial length is about 5 percent of the axial spike length.

* * * * *